United States Patent
Zeng

(10) Patent No.: US 10,176,003 B2
(45) Date of Patent: Jan. 8, 2019

(54) INTEGRATED FRAMEWORK FOR MONITORING BUSINESS ACTIVITIES

(71) Applicant: SAP SE, Walldorf (DE)

(72) Inventor: Ying Zeng, Fremont, CA (US)

(73) Assignee: SAP SE, Walldorf (DE)

( * ) Notice: Subject to any disclaimer, the term of this patent is extended or adjusted under 35 U.S.C. 154(b) by 1135 days.

(21) Appl. No.: 14/474,308

(22) Filed: Sep. 2, 2014

(65) Prior Publication Data

US 2016/0063424 A1 Mar. 3, 2016

(51) Int. Cl.

| G06F 9/455 | (2018.01) |
| G06Q 10/06 | (2012.01) |
| H04L 12/26 | (2006.01) |
| G06F 9/50 | (2006.01) |
| G06F 17/30 | (2006.01) |
| H04L 29/08 | (2006.01) |
| H04W 12/06 | (2009.01) |

(52) U.S. Cl.
CPC ........ G06F 9/45558 (2013.01); G06F 9/5072 (2013.01); G06F 17/3051 (2013.01); G06Q 10/0635 (2013.01); G06Q 10/06393 (2013.01); H04L 43/0888 (2013.01); G06F 2009/4557 (2013.01); H04L 67/16 (2013.01); H04W 12/06 (2013.01)

(58) Field of Classification Search
None
See application file for complete search history.

(56) References Cited

U.S. PATENT DOCUMENTS

| 7,516,155 | B2 * | 4/2009 | Ivan | G06F 17/3051 |
| 7,667,582 | B1 * | 2/2010 | Waldorf | G06T 11/206 |
| | | | | 340/440 |
| 8,032,404 | B2 * | 10/2011 | Lee | G06Q 10/063118 |
| | | | | 705/7.17 |
| 9,760,391 | B2 * | 9/2017 | Kiess | G06F 9/45558 |
| 2005/0246215 | A1 * | 11/2005 | Rackham | G06Q 10/06 |
| | | | | 705/7.11 |
| 2007/0022410 | A1 * | 1/2007 | Ban | G06Q 10/06 |
| | | | | 717/136 |

(Continued)

*Primary Examiner* — Gurkanwaljit Singh
(74) *Attorney, Agent, or Firm* — Buckley, Maschoff & Talwalkar LLC

(57) ABSTRACT

Methods and system are disclosed that assist monitoring activities in an organization in real-time using an integrated application. In one aspect, the integrated application establishes a connection with a central monitoring framework and an in-memory data store. The in-memory data store includes business data and associated key performance indicators (KPIs). In response to a detection of a modification of key performance indicators or an unauthorized access of the business data, an analytical engine associated with the integrated application analyzes the associated KPIs and/or the business data and generates results including modified KPIs and identifiers. Based on the identifiers, the KPIs and the modified KPIs are mapped with control parameters in a corresponding framework to determine a deviation in the values of KPIs and a workflow in the corresponding framework is instantiated. Upon instantiating the workflow, the KPIs are displayed on a user interface that provides monitoring information in real-time.

20 Claims, 5 Drawing Sheets

(56) References Cited

U.S. PATENT DOCUMENTS

| | | | |
|---|---|---|---|
| 2007/0106520 A1* | 5/2007 | Akkiraju | G06Q 10/06 717/105 |
| 2007/0271277 A1* | 11/2007 | Ivan | G06F 17/3051 |
| 2008/0082517 A1* | 4/2008 | Sattler | G06F 8/71 |
| 2008/0172273 A1* | 7/2008 | Rackham | G06Q 10/06 705/7.39 |
| 2008/0177622 A1* | 7/2008 | Akkiraju | G06Q 10/06 705/7.36 |
| 2008/0215400 A1* | 9/2008 | Ban | G06Q 10/06 705/7.22 |
| 2008/0312979 A1* | 12/2008 | Lee | G06Q 10/063118 705/7.28 |
| 2014/0025426 A1* | 1/2014 | Doehring | G06Q 10/06 705/7.27 |

* cited by examiner

INTEGRATED FRAMEWORK FOR MONITORING BUSINESS ACTIVITIES

BACKGROUND

Monitoring applications and processes play significant role in enterprises. Monitoring activities may be accomplished using monitoring systems that may be deployed in the enterprises. The stakeholders administering such activities in the enterprises, may login into such monitoring systems to monitor the activities. However, executing monitoring activities for managing access to information and enforcing information security across multiple business areas may be challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Figure 1:
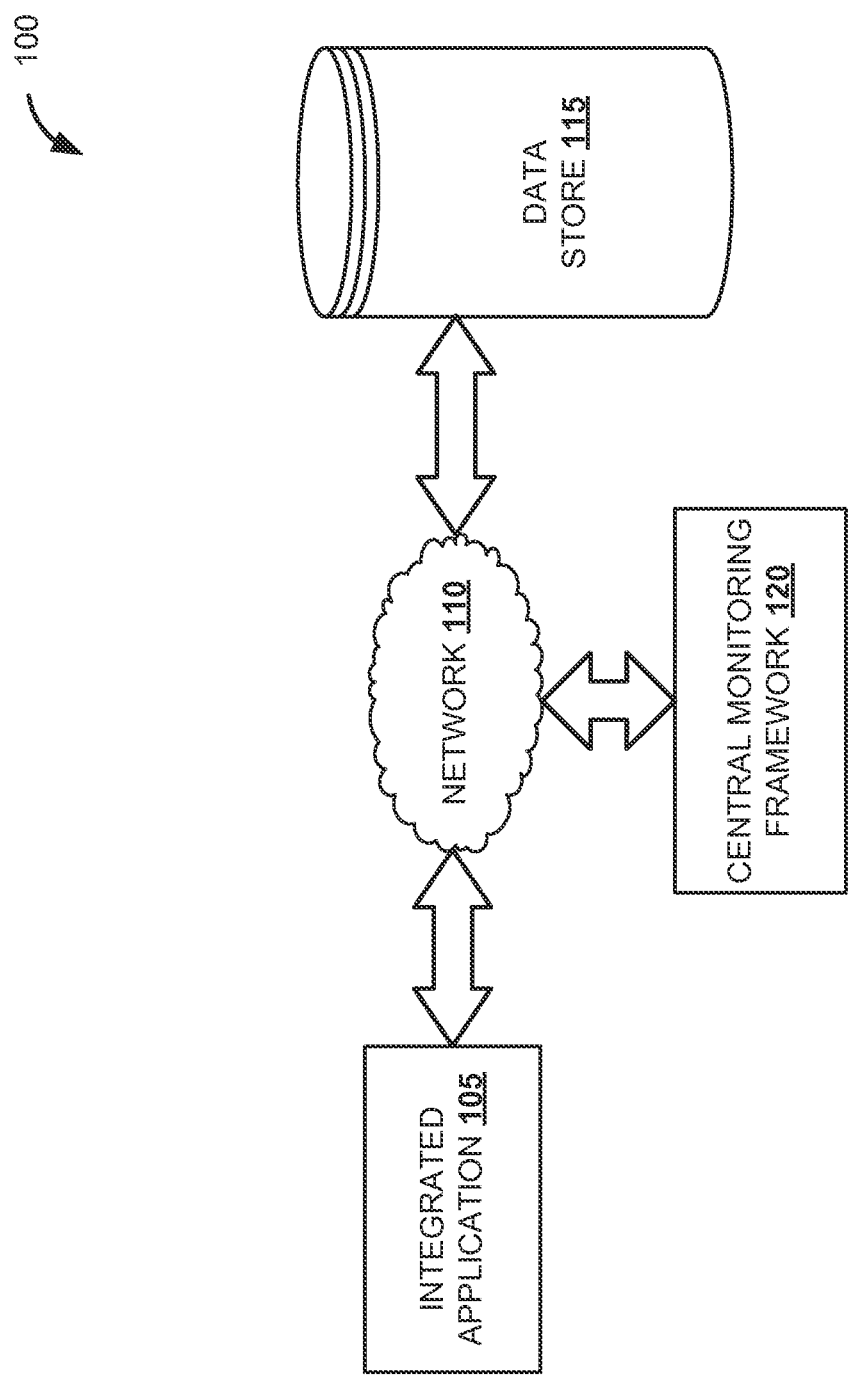
FIG. 1 is a block diagram illustrating an environment to monitor activities, according to an embodiment.

Embodiments of techniques related to an integrated framework for monitoring business activities are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Technological evolution has contributed significantly to growth of organizations. Business data associated with the organizations may increase in volume as a function of time. Business data may be associated with multiple business areas, and may be stored in distributed data stores and repositories that may be centrally accessible.

To manage access to such business data, monitor corresponding business activities, and enforce information security for such distributed business data, an organization may develop governance models and strategies. The governance models may encompass applicable laws and regulations defining granularities for consumption of business data. The business activities in the organization may be monitored such that they comply with these governance models. Information security may be enforced to defend the business information from unauthorized access, usage, modification, disclosure etc.

Monitoring activities may preserve confidentiality of related information, ensure restricted access to such information, enhance awareness of business activities, enable analysis of their performances, etc. Monitoring business activities may encompass measuring business performance, monitoring real-time and completed processes, detecting or determining anomalies in the execution of processes, etc. Monitoring may also encompass activities of employees, customers, third-party service providers, etc., to comply with governance and compliance, and assess risks on account of violations in compliance. Additionally the organizations may have monitoring systems and frameworks to monitor any increase in volume of business data on account of business diversification or business expansion.

In an embodiment, a governance model may include organizational information and hierarchical control structures. The governance model may be used to regulate activities related to access management, information security, data privacy, etc. Governance models may ensure that such critical information is complete, accurate and timely for making decisions by management to align with the overall organizational strategy and business objectives.

In an embodiment, risk management may include a set of processes or rules for identifying, analyzing and responding to risks that may adversely affect the organizational strategy and business objectives. By way of example, risks may correspond to technological risks, commercial or financial risks, information security risks, data privacy risks, etc. In an embodiment, compliance may correspond to conforming to stated requirements. The stated requirements may be defined in laws, regulations, contracts, strategies, policies, etc.

FIG. 1 is a block diagram illustrating environment 100 to monitor activities, according to an embodiment. By way of illustration, FIG. 1 shows integrated application 105 in communication with central monitoring framework 120 and data store 115 over network 110. In an embodiment, central monitoring framework 120 may be configured to work in conjunction with integrated application 105, to monitor activities in an organization.

In an embodiment, data store 115 includes business data, such as, process data (e.g., data related to business processes), application data, data related to compliance regulations, risk matrix and risk factors, financial records, etc., associated with the organization. Data store 115 may represent a database, an in-memory database, an operational data store, a web based data service, a database deployed in a cloud computing environment, etc., containing structured and unstructured data. The business data may be stored in multiple data structures, for example, tables, tree structures or graphs in the data store. Some business data may be associated with key performance indicators (KPIs) and/or key risk indicators (KRIs).

In an embodiment, integrated application 105 may be deployed as a standalone application on a general purpose computer or a server or in a cloud computing environment. When the integrated application is deployed in the cloud computing environment, the functionality of the integrated application may be consumed by a user as a service. The integrated application 105 may include multiple engines working in conjunction with each other. By way of example, integrated application 105 may include an analytical engine, a user interface (UI) engine, etc. The analytical engine may be configured to analyze the business data and the KPIs associated with the business data. The user interface engine may be configured to generate user interfaces and display graphical visualizations, such as, KPIs/KRIs, charts and lists, associated with the business data residing in data store 115.

In an embodiment, central monitoring framework 120 may include an integration of frameworks, also referred to as "integrated framework", multiple engines and applications that may be configured to work in conjunction with each other. The integrated application 105 in conjunction with central monitoring framework 120 may be used to monitor business activities in the organization. The integrated framework may include an integration of, for example, a compliance regulation framework, a risk assessment framework, an audit management framework, etc. Each framework may include business rules and definitions, workflows, etc., that may support monitoring activities in real-time. In response to a detection or determination of a suspicious activity, workflows in the corresponding frameworks may be triggered to initiate actions and provide remedial solutions.

Figure 2:
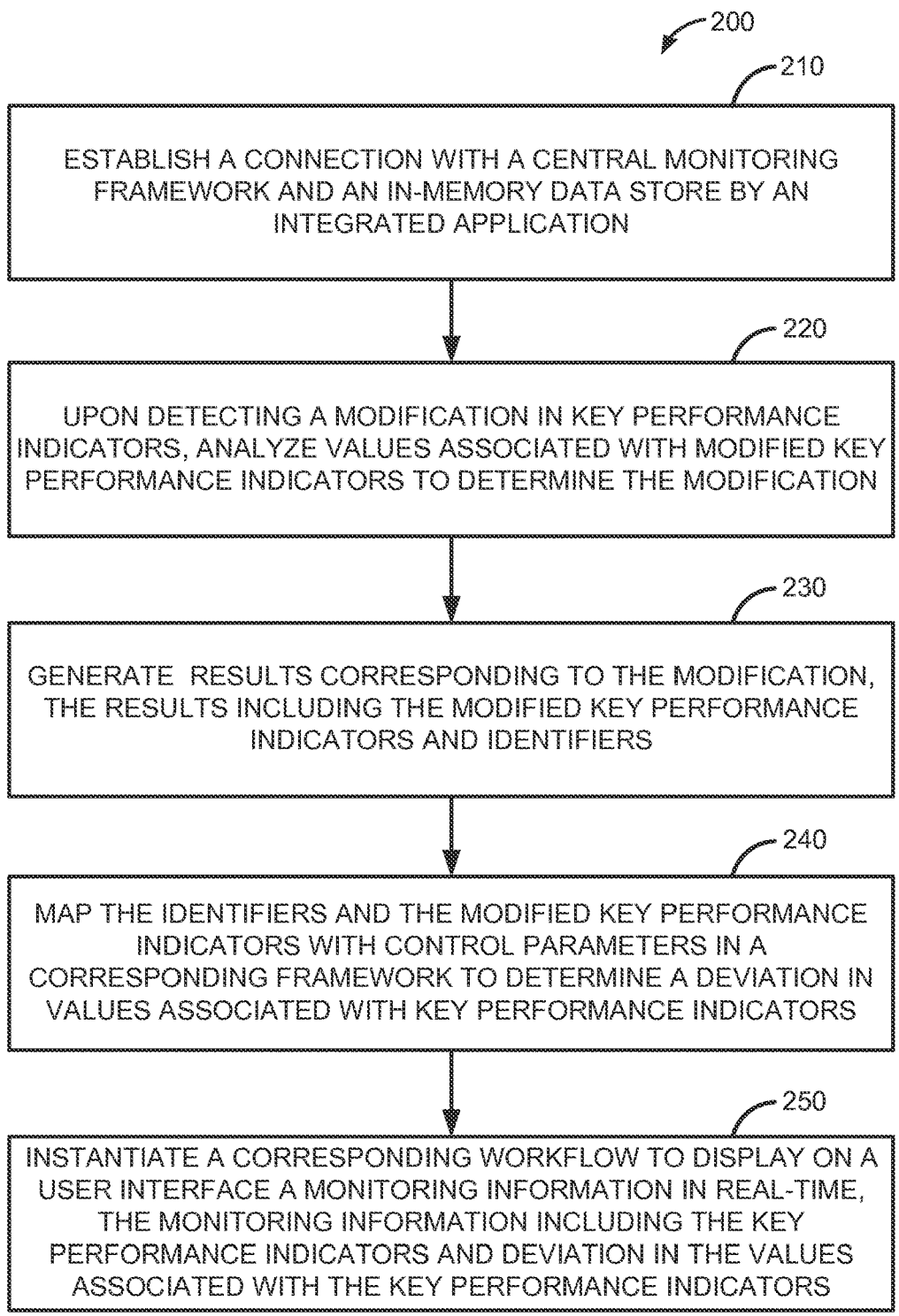
FIG. 2 is a flow diagram illustrating a process to monitor activities in real-time, according to an embodiment.

FIG. 2 is a flow diagram illustrating process 200 to monitor activities in real-time, according to an embodiment. Process 200, upon execution, provides a mechanism to monitor activities in an organization via a central monitoring framework, including managing access to business data, monitoring corresponding business activities, and enforcing information security for business data. The central monitoring framework may be in communication with an integrated application and an in-memory data store over a network. The central monitoring framework may work in conjunction with the integrated application and the in-memory data store to monitor the activities in the organization.

In an embodiment, the in-memory data store may store unstructured or structured business data in multiple data formats. By way of example, the data formats may include spreadsheet, flat file, power point presentation, email, table, text document, etc. Some business data may be associated with KPIs and/or KRIs and may be used to monitor activities (e.g., provide monitoring information) in the organization. The business data may be stored in data structures (e.g., tables) and may be associated with business processes, applications and systems, financial information, data related to compliance regulation, data related to risk assessment, data related to audit management, confidential information, such as, trade secrets, important business emails, presentations, etc., historical risk assessment data, historical compliance regulation data; historical audit management data, etc.

In an embodiment, the business data in the in-memory data store may be stored as a row store or a column store. In the row store, the fields of every row are stored sequentially, while in the column store, the fields of every column are stored in contiguous memory locations. In row based storage, a database table may be stored as a sequence of records, each of which contains the fields of one row, while in a column based storage the entries of a column are stored in contiguous memory locations. The row based storage and column based storage of the business data may be modeled and accessed by various components of the in-memory management system, such as front-end development applications, database applications, query processing engine, etc. In column based storage, values associated with business data may be stored as columns in contiguous memory locations. These stored values may be intrinsically sorted to arrange several contiguous values adjacent to each other.

In an embodiment, the integrated application may include an integration of multiple engines and applications that may be configured to work in conjunction with each other. By way of example, the integrated application may include an analytical engine, a user interface engine, etc. The analytical engine may be configured with business rules and definitions for performing analysis on the business data. The analytical engine may analyze the KPIs associated with the business data and generate results based on the analysis. The user interface engine associated with the integrated application may be configured to generate multiple user interfaces. The user interfaces may render or display KPIs, remedial solutions, etc., in response to a detection and/or determination of suspicious activities, accessing and/or modifying the business data, etc.

In an embodiment, the central monitoring framework may also include multiple engines or applications, such as, a connector engine or a connector application, a workflow processing engine, a mapping engine, etc., that work in conjunction with the integrated framework. The connector engine or connector application may be configured to establish communication between the integrated application and the central monitoring framework. The workflow processing engine may be configured to trigger and instantiate workflows in the integrated framework.

In an embodiment, the compliance regulation framework may be configured to monitor and regulate activities related to compliance regulations governing the organization and may include business rules and definitions, workflows, etc., to regulate activities related to compliance. The compliance regulation framework may be configured to work in conjunction the workflow processing engine and communicate with the in-memory data store to access historical data related to compliance regulation.

In an embodiment, the risk assessment framework may be configured to monitor suspicious activities that may generate risks. The risk assessment framework may include business rules and definitions, workflows, etc., to determine and mitigate risks. The risk assessment framework may be configured to work in conjunction the workflow processing engine in the central monitoring framework and communicate with the in-memory data store to access historical data related to risk assessment.

In an embodiment, the audit management framework may be configured to monitor addition of new business data to the in-memory data store. The audit management framework may be configured to work in conjunction the workflow processing engine and communicate with the in-memory data store to access data related to audit management.

By way of example, consider an organization "XYZ, Inc.," that deals with manufacturing and marketing consumer products (e.g., consumer products related to personal care). The organization "XYZ, Inc.," may have governance models for business data associated with different business areas and may have optimized strategies for managing access to the business data. The governance models may include multiple data models and may be used to generate risk matrices that are consistent with the organizational goals. The organizational goals may be achieved by regulating compliance to have an accurate assessment of security risks, on account of violations of compliance regulations. The governance model and the business data may be stored in an in-memory data store that may be centrally accessible in the organization.

In an embodiment, consider "John Smith," who is a "data analyst", working with the organization "XYZ, Inc.," and administers or monitors activities in real-time that are related to compliance regulation, audit management and risk assessment. Consider "John Smith" may execute such monitoring activities via an integrated application that is in communication with a central monitoring framework. Consider "John Smith" has access to employee profiles and segregation of duties of the "XYZ Inc.," organization, and generates governance models and strategies for managing access to the business data. For instance, consider "John Smith" generating such governance models or governance procedures and risks based on an assessment of employee profiles and segregation of duties.

In an embodiment, "John Smith" may use the integrated application to monitor the activities in the organization. A connection is established with the central monitoring framework and an in-memory data store by the integrated application, at 210. The integrated application in conjunction with the central monitoring framework may monitor the activities in the organization. The central monitoring framework may be configured to monitor modifications (e.g., update, add, delete, modify/change value, etc.) in the business data and associated KPIs residing in the in-memory data store.

In an embodiment, upon detecting a modification in the KPIs, the analytical engine associated with the integrated application may analyze values associated with modified KPIs (e.g., modified KPI values) to determine the modification, at 220. The KPIs may be modified (e.g., the KPI values may be modified) when an unauthorized user attempts to access the business data and/or modify the business data.

By way of example, consider "Racheal Dawn" is working with the IT department of the organization "XYZ, Inc.". Based on employee profile and segregation of duties, "Racheal Dawn" may not be authorized to have access to the financial transactions of the organization. In an embodiment, consider a scenario where "Racheal Dawn" may attempt to access the financial transactions. By way of example, consider KPIs 'A' and 'B' are associated with business data related to financial transactions of the organization. The governing model may include business rules and definitions corresponding to compliance regulation and risk assessment, to provide authorized access to the business data. Consider KPI or KRI 'A' that is associated with user authorization and KPI or KRI 'B' that is associated with modification of financial records in the financial transactions. When "Racheal Dawn" attempts to access files including financial transaction information, the value of KPI or KRI 'A' may be modified. Suppose "Racheal Dawn" accesses the financial transaction and attempts to modify (e.g., copy, cut, take a screen shot, make a copy of the file, etc.), the value of KPI or KRI 'B' may be modified. In response to a determination or detection of such modification, the analytical engine associated with the integrated application may be instantiated and the modified values corresponding to the values associated with KPI or KRIs 'A' and 'B' may be analyzed to determine the modification.

In an embodiment, based on the analysis, at 230, the analytical engine associated with the integrated application may generate results corresponding to the modification, the results including the modified values of the KPIs and identifiers. The identifiers may be associated with the integrated frameworks in the central monitoring framework. By way of example, the identifiers may be associated with the compliance regulation framework, and the risk assessment framework. In an embodiment, the frameworks in the integrated framework may include control information and associated control parameters. The control parameters may include business rules and definitions for regulating the values of KPIs (e.g., definitions corresponding to specific KPI values; business rules for combining multiple KPIs; desired or acceptable KPI values, etc.).

In an embodiment, a mapping engine associated with the central monitoring framework may map the identifiers and the modified values of the KPIs with the control parameters in the corresponding framework to determine a deviation in the values associated with the KPIs, at 240. Based on the determination of the deviation in the values associated with the KPIs, the workflow processing engine in the central monitoring framework may be triggered to instantiate a workflow in a corresponding framework. By way of example, the workflow processing engine may trigger a workflow in the compliance regulation framework, and the risk assessment framework. Upon instantiating the corresponding workflows in the corresponding frameworks, a user interface may display monitoring information in real-time, the monitoring information including the KPIs and the deviation in the values associated with the KPIs, at 250. The user interface rendering the KPIs and the deviation in the values associated with the KPIs may provide information related to activities in the organization, in real-time, and may correspond to monitoring information associated with the activities in the organization.

In an embodiment, the business data and the associated KPIs may correspond to confidential information, governing models or data models for the business data corresponding to compliance regulation, governing models or data models for generating risk matrix, risk assessment, governing models for audit management, financial information, and other information related to risk assessment, etc. The monitoring of activities in real-time may support generating information related to risks (e.g., risk assessments), compliance violations, violations related to business data associated with financial information (e.g., financial transactions/records, such as modification, manipulation, sharing information via electronic means), unauthorized access of confidential information, etc.

In an embodiment, in response to instantiating the workflow in the corresponding framework (e.g., the compliance regulation framework, the risk assessment framework, the audit management framework) remedial measures or remedial solutions may be determined. The remedial measures or remedial solutions may be displayed on a user interface associated with the integrated application. In an embodiment, the remedial solutions in each framework (e.g., the compliance regulation framework, the risk assessment framework, the audit management framework) may be associated with an execution of conditions or business rules that may generate potential business risks. In the above example, the central monitoring framework may generate an alert and notify "John Smith" by rendering information related to modified business data and associated KPI value (e.g., financial transactions, financial records, KPIs 'A' and 'B', etc.) and the corresponding remedial solutions on a user interface associated with the integrated application.

In an embodiment, in response to instantiating the workflow in the corresponding framework an agent may be assigned to address and handle the detected risk associated with the activity. By way of example, the agent may include a "Compliance and Regulation Officer" (CRO), who may determine the gravity of risk. In an embodiment, the CRO may initiate and execute further actions to mitigate the detected risk.

In an embodiment, consider "XYZ Inc." diversifies business functions that may contribute to an exponential increase of the business data. The audit management framework in the central monitoring framework, may monitor such activities in real-time, and may generate a notification or alert to notify "John Smith" about the additional business data. "John Smith" may analyze the additional business data and define new governance models (and data models) and access information related to employee profiles and segregation of duties to create or generate new strategies for managing access to the additional business data. "John Smith" may use data definition tools of the analytical engine in the integrated application to configure and define new KPIs and/or KRIs for the additional business data.

In an embodiment, "John Smith" may also define or update or create new workflows in the compliance management framework and the risk assessment framework. Based on the analysis of the additional business data. "John Smith" may create new workflows in the audit management framework that may automate monitoring and create or generate new governance models, in response to detection or determination of additional business data. Such automated monitoring of the additional business data in real-time, therefore increases efficiency and builds a robust strategy for governing the business data, thereby reducing the efforts associated with audit management.

Figure 3:
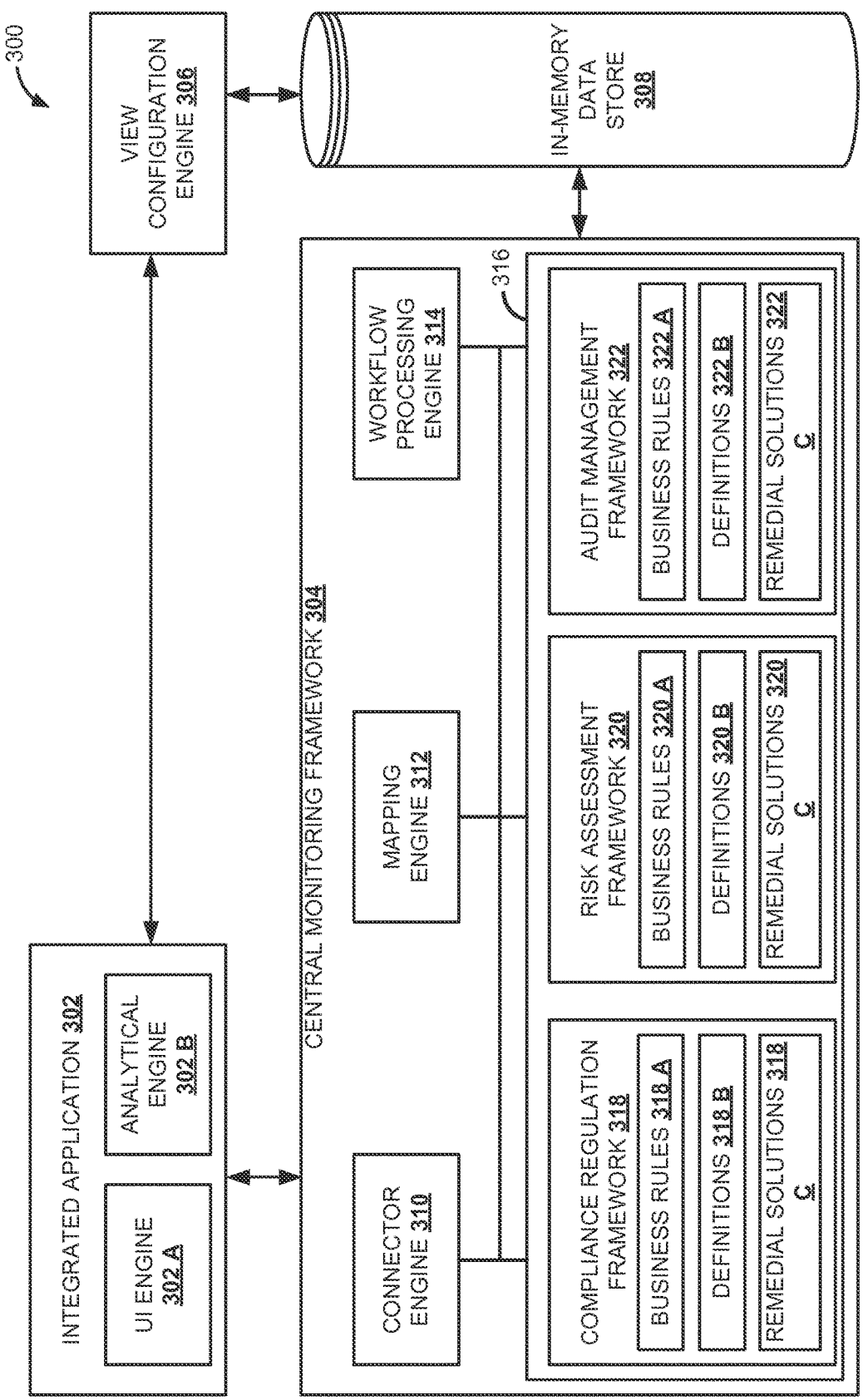
FIG. 3 is a block diagram illustrating a system to monitor activities in real-time, according to an embodiment.

FIG. 3 is a block diagram illustrating system 300 to monitor activities in real-time, according to an embodiment. By way of illustration. FIG. 3 shows the system 300 including integrated application 302 in communication with central monitoring framework 304, view configuration engine 306 and in-memory data store 308 over a network (not shown). In an embodiment, integrated application 302 may include analytical engine 302 B and user interface (UI) engine 302 A. Analytical engine 302 B may be configured with business rules and definitions. By way of example, analytical engine 302 B may be configured with definitions associated with KPIs, business rules and definitions for performing or executing analysis, etc. during design time. The UI engine 302 A may include graphical layouts, graphical elements, etc., for generating graphical visualizations, charts, lists, etc. In system run time, analytical engine 302 B may analyze the values associated with KPIs based on a detection of a modification of the KPIs (e.g., KPI values) and generate results, e.g., according to the definitions configured during the system design time. As discussed previously, the generated results may be used to instantiate workflows in the corresponding framework.

In an embodiment, central monitoring framework 304 includes connector application or connector engine 310, mapping engine 312, workflow processing engine 314 and integrated framework 316. By way of example, integrated framework 316 may include integration of compliance regulation framework 318, risk assessment framework 320 and audit management framework 322. The connector engine 310 may establish communication between central monitoring framework 304 and integrated application 302. The connector engine 310 may be configured to push the results generated by analytical engine 302 B of integrated application 302 to integrated framework 316. The mapping engine 312 may be configured to map the identifiers and the modified KPI values with the control parameters to determine deviations in the values associated with the KPIs. The workflow processing engine 314 may be configured to trigger workflows (not shown) in the corresponding frameworks (e.g., 318, 320 and 322) based on the identifiers.

In an embodiment, the workflow in compliance regulation framework 318 may be instantiated, when a violation of regulation related to compliance is determined or detected. Compliance regulation framework 318 may be configured with business rules 318 A, definitions 318 B, remedial solutions 318 C, etc. By way of example, compliance regulation framework 318 may be configured with definitions 318 B, such as, compliance regulations, organizational structure, process structure, control structure, etc., during system design time. Additional business rules 318 A and definitions 318 B may be configured to instantiate specific workflows in response to the detection of compliance violations. In system runtime, workflows in compliance regulation framework 318 may be instantiated to determine and enforce remedial solutions or remedial measures.

In an embodiment, the workflow in risk assessment framework 320 may be instantiated, when suspicious activities are determined or detected that may generate risks. In system design time, risk assessment framework 320 may be configured with business rules 320 A, definitions 320 B, remedial solutions 320 C, etc. By way of example, risk assessment framework 320 may be configured with definitions 320 B, such as, activities structure, organizational structure, risk structure, key risk indicators (KRIs), response to risks and mitigation of risks, risk KRI-KPI mapping, etc. Additional business rules 320 A and definitions 320 B may be configured to instantiate specific workflows in response to the determination or detection of activities that may generate risks. In system runtime, workflows in risk assessment framework 320 may be instantiated to determine and enforce remedial solutions or remedial measures.

In an embodiment, the workflow in 322 audit management framework may be instantiated in response to detection or determination of addition of new business data to the in-memory data store. In system design time, audit management framework 322 may be configured with business rules 322 A, definitions 322 B, remedial solutions 322 C, data models (not shown), KPIs or KRIs, etc. By way of example, audit management framework 322 may be configured with definitions 322 B and business rules 322 A, such as, audit definitions, organizational structure, business rules related to audit management, audit test, business rules for workflow instantiation and management, audit test-KPI mapping, etc. In system runtime, workflows in audit management framework 322 may be instantiated to execute audit management functions included in audit management framework 322.

In an embodiment, view configuration engine 306 may be configured to define attributes, views, business logic, etc., based on data models and data structures (e.g., tables) residing in in-memory data store 308. Based on business demands, view configuration engine 306 may be configured with definitions including expressions, conditions, rules and definitions for business data conversion and transformation, regulate control flow, etc. The view configuration engine 306 may be configured to filter business data based on the data models residing in in-memory data store 308, and execute operations like joining (e.g., outer join, inner join, etc.) the data structures in in-memory data store 308.

In an embodiment, in-memory data store 308 may include structured and unstructured business data in multiple data formats. The in-memory data store 308 may store data models that may include definitions for defining relationships (e.g., entity-relationship—1:m, 1:1, etc.) between the attributes, views, data objects (e.g., business objects), etc., corresponding to the business data residing in the data structures (not shown) in in-memory data store 308. The data models may also include definitions (e.g., 318 B, 320 B, 322 B) and business rules (e.g., 318 A, 320 A, 322 A) for identifying business data. Additionally, the data models may correspond to governing the business data to meet the operational goals of the organization. By way of example, data model including identifier 'CR' may correspond to business data related to compliance regulation; data model including identifier 'RA' may correspond to the business data related to risk assessment; and data model including identifier 'AM' may correspond to the business data related to audit management, and so on.

In an embodiment, in integrated framework 316, compliance regulation framework 318, risk assessment framework 320 and audit management framework 322 may be instantiated individually or in conjunction with each other, in response to detection of change in values associated with KPIs or KRIs.

Figure 4:
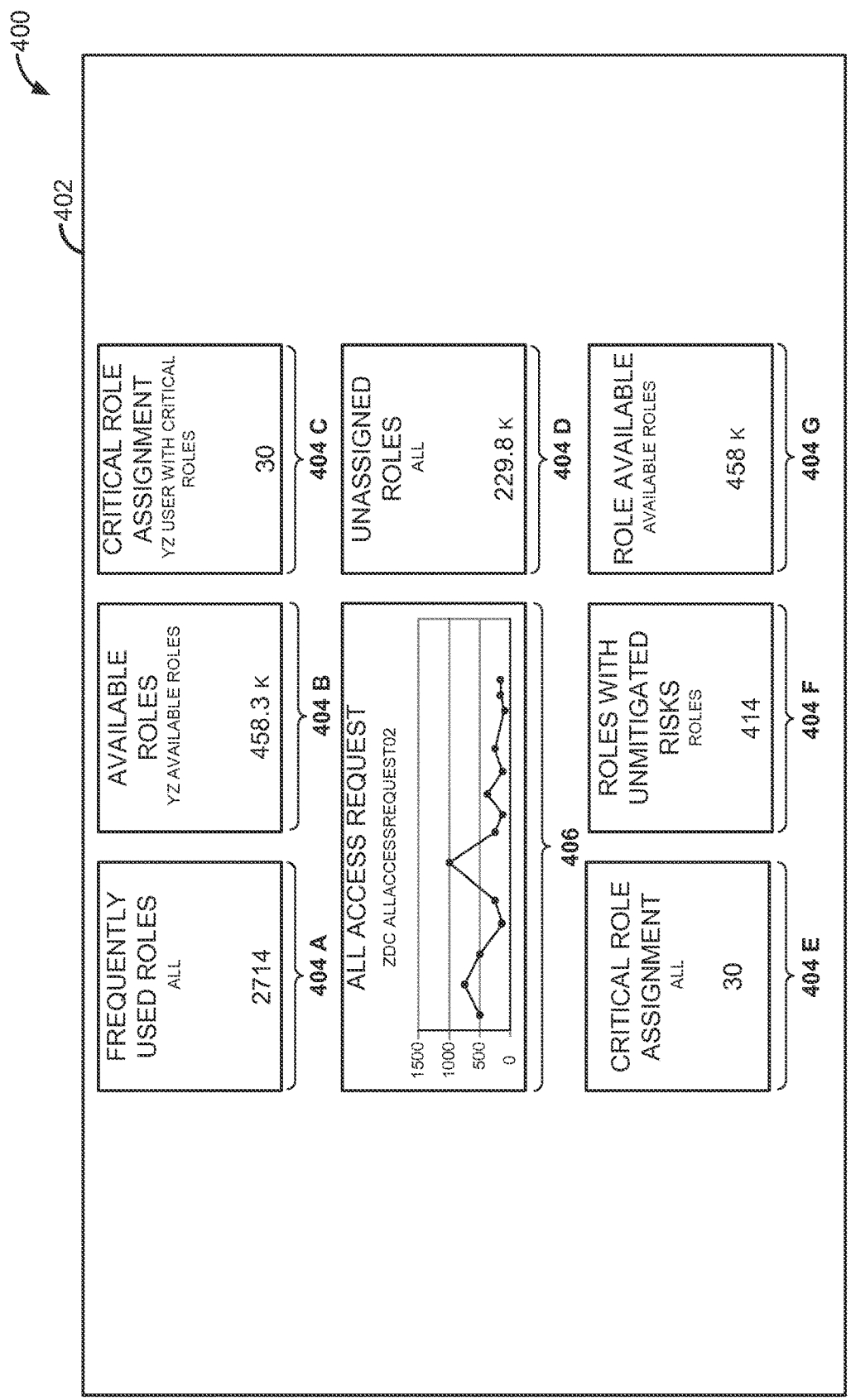
FIG. 4 is a block diagram illustrating a user interface displaying key performance indicators, according to an embodiment.

FIG. 4 is a block diagram illustrating user interface 400 displaying key performance indicators, according to an embodiment. By way of illustration, FIG. 4 shows user interface screen 402 rendering KPIs 404 A, 404 B, 404 C, 404 D, 404 E, 404 F, 404 G and KRIs 406 represented as graphical visualization corresponding to access requests. KPIs 404 A, 404 B, 404 C, 404 D, 404 E, 404 F, 404 G and KRIs 406 be associated with business data stored in an in-memory data store. As discussed previously, KPIs 404 A, 404 B, 404 C, 404 D, 404 E, 404 F, 404 G and KRIs 406 may be used to monitor activities. In response to detection of a modification of the KPIs 404 A, 404 B, 404 C, 404 D, 404 E, 404 F, 404 G and KRIs 406, the KPIs 404 A, 404 B, 404 C, 404 D, 404 E, 404 F, 404 G and KRIs 406 may be analyzed, results generated and mapped to corresponding frameworks to determine the deviation in the values of the KPIs 404 A, 404 B, 404 C, 404 D, 404 E, 404 F, 404 G and KRIs 406. Based on the deviation in the values associated with the KPIs or KRIs 404, 406, corresponding workflows in corresponding frameworks may be instantiated. The modified values of KPIs 404 A, 404 B, 404 C, 404 D, 404 E, 404 F, 404 G and KRIs 406 and the original values of the KPIs 404 A, 404 B, 404 C, 404 D, 404 E, 404 F, 404 G and KRIs 406 may be rendered on user interface 400 that may provide monitoring information associated with the activities in the organization.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a tangible computer readable storage medium. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
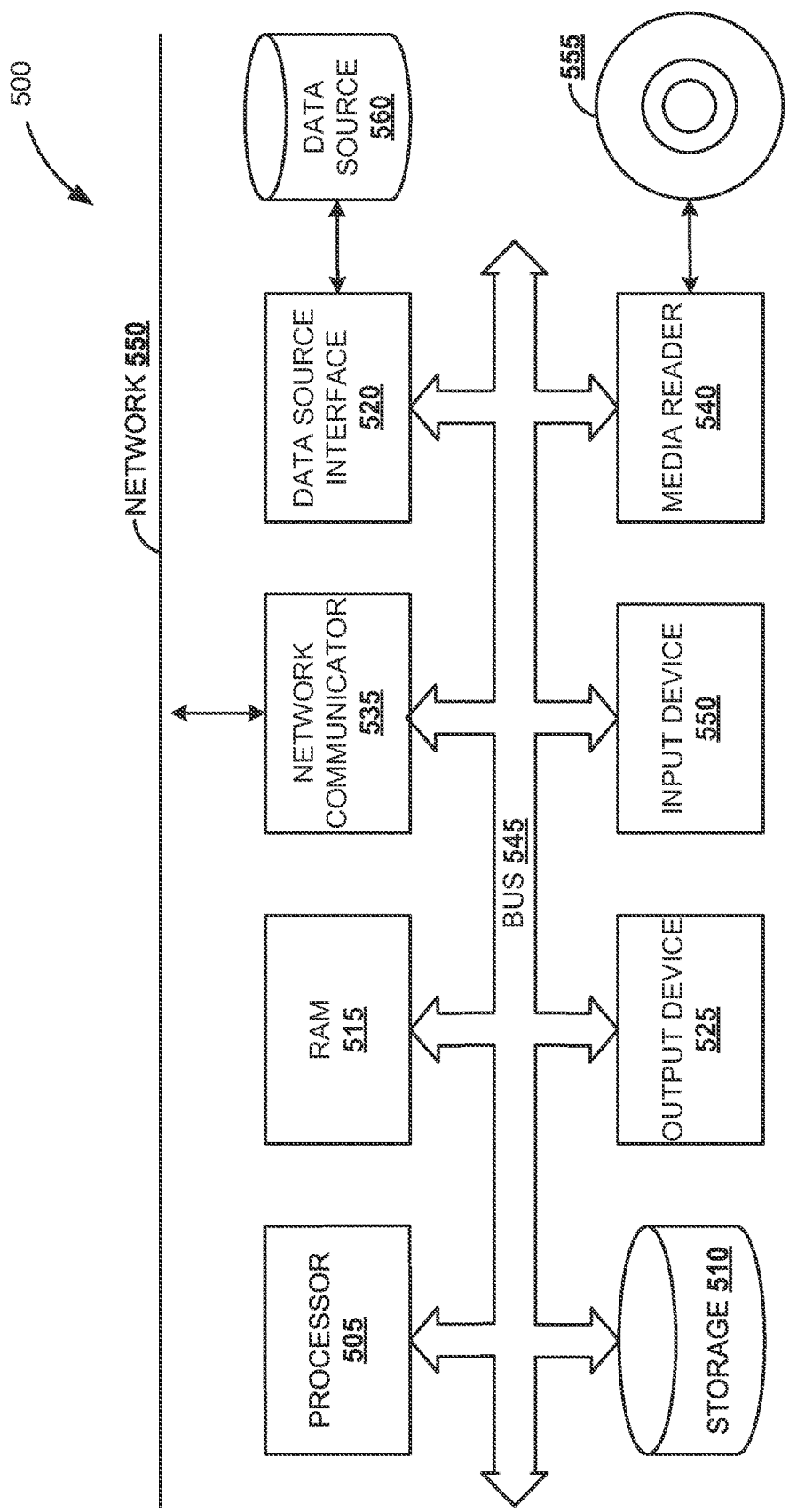
FIG. 5 is a block diagram of a computer system, according to an embodiment.

FIG. 5 is a block diagram of an exemplary computer system 500, according to an embodiment. Computer system 500 includes processor 505 that executes software instructions or code stored on computer readable storage medium 555 to perform the above-illustrated methods. Processor 505 can include a plurality of cores. Computer system 500 includes media reader 540 to read the instructions from computer readable storage medium 555 and store the instructions in storage 510 or in random access memory (RAM) 515. Storage 510 provides a large space for keeping static data where at least some instructions could be stored for later execution. According to some embodiments, such as some in-memory computing system embodiments, RAM 515 can have sufficient storage capacity to store much of the data required for processing in RAM 515 instead of in storage 510. In some embodiments, all of the data required for processing may be stored in RAM 515. The stored instructions may be further compiled to generate other representations of the instructions and dynamically stored in RAM 1015. Processor 505 reads instructions from RAM 515 and performs actions as instructed. According to one embodiment, computer system 500 further includes output device 525 (e.g., a display) to provide at least some of the results of the execution as output including, but not limited to, visual information to users and input device 530 to provide a user or another device with means for entering data and/or otherwise interact with computer system 500. Each of these output devices 525 and input devices 530 could be joined by one or more additional peripherals to further expand the capabilities of computer system 500. Network communicator 535 may be provided to connect computer system 500 to network 550 and in turn to other devices connected to network 550 including other clients, servers, data stores, and interfaces, for instance. The modules of computer system 500 are interconnected via bus 545. Computer system 500 includes a data source interface 520 to access data source 560. Data source 560 can be accessed via one or more abstraction layers implemented in hardware or software. For example, data source 560 may be accessed by network 550. In some embodiments data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer system to monitor activities in real-time, comprising:
   one or more processors; and
   one or more memory devices communicatively coupled with the one or more processors and the one or more memory devices storing instructions that when executed on the one or more processors cause the one or more processors to:
   establish a connection with a central monitoring framework and an in-memory data store by an integrated application, the in-memory data store storing business data associated with one or more key performance indicators,
   wherein the integrated application includes a plurality of engines that operate in conjunction with each other, including an analytical engine and a user interface engine, and
   wherein the central monitoring framework is configured to operate in conjunction with the integrated application to monitor activities in real-time, the activities including monitoring modifications in the business data and the associated key performance indicators stored in the in-memory data store;
   detect a modification in the one or more key performance indicators;
   analyze, by the analytical engine, one or more values associated with the one or more key performance indicators to determine the modification;
   generate one or more results corresponding to the modification, the one or more results including one or more modified key performance indicators and one or more identifiers;
   map, via a mapping engine associated with the central monitoring framework, the one or more identifiers and the one or more modified key performance indicators with one or more control parameters in a corresponding framework to determine a deviation in the one or more values associated with the one or more key performance indicators;
   trigger and instantiate, via a workflow processing engine associated with the central monitoring framework, a corresponding workflow based on the deviation in the one or more values; and
   generate, via the user interface engine, a first user interface to display monitoring information in real-time, the monitoring information including the one or more key performance indicators and the deviation in the one or more values associated with the key performance indicators.

2. The computer system of claim 1, wherein the detecting the modification includes: determining one or more values corresponding to the one or more key performance indicators, wherein the one or more key performance indicators correspond to the business data including financial information, compliance information, and confidential information.

3. The computer system of claim 1, wherein the workflow is associated with at least one of a compliance regulation framework, a risk assessment framework and an audit management framework.

4. The computer system of claim 1, wherein monitoring information in real-time corresponds to determining at least one of:
   one or more risks, wherein the one or more risks are associated with the modification of the business data corresponding to the risk assessment business data;
   one or more compliance violations, wherein the one or more compliance violations are associated with the modification of the business data corresponding to the compliance regulation business data; and
   one or more financial records violations, wherein the one or more financial record violations are associated with the modification of the business data corresponding the audit management business data.

5. The computer system of claim 1, further comprising instructions configured to cause the one or more processors to: determine one or more remedial solutions in response to the instantiation of the workflow in the corresponding framework.

6. The computer system of claim 5, further comprising instructions configured to cause the one or more processors to: display the one or more remedial solutions on a second user interface associated with the integrated application.

7. The computer system of claim 1, further comprising instructions configured to cause the one or more processors to: determine the framework based on the one or more identifiers, the framework selected from a group consisting of the compliance regulation framework, the risk assessment framework and the audit management framework.

8. A computer implemented method to monitor activities in real-time, comprising:
establishing a connection between a central monitoring framework and an in-memory data store by an integrated application, the in-memory data store storing business data associated with one or more key performance indicators,
wherein the integrated application includes a plurality of engines that operate in conjunction with each other, including an analytical engine and a user interface engine, and
wherein the central monitoring framework is configured to operate in conjunction with the integrated application to monitor activities in real-time, the activities including monitoring modifications in the business data and the associated key performance indicators stored in the in-memory data store;
detecting a modification in the one or more key performance indicators;
analyzing, by the analytical engine, one or more values associated with the one or more key performance indicators to determine the modification;
generating, by a processor of a computer, one or more results corresponding to the modification, the one or more results including one or more modified key performance indicators and one or more identifiers;
mapping, via a mapping engine associated with the central monitoring framework, the one or more identifiers and the one or more modified key performance indicators with one or more control parameters in a corresponding framework to determine a deviation in the one or more values associated with the one or more modified key performance indicators;
based on the determination of the deviation in the one or more values, triggering and instantiating, via a workflow processing engine associated with the central monitoring framework, a corresponding workflow; and
displaying on a user interface, via the user interface engine, monitoring information in real-time, the monitoring information including the one or more key performance indicators and the deviation in the one or more values associated with the one or more key performance indicators.

9. The computer implemented method of claim 8, wherein detecting the modification includes: determining the one or more values corresponding to the one or more key performance indicators, wherein the one or more key performance indicators correspond to the business data including financial information, compliance information and confidential information.

10. The computer implemented method of claim 8, wherein the corresponding workflow is associated with at least one of a compliance regulation framework, a risk assessment framework and an audit management framework.

11. The computer implemented method of claim 8, wherein the monitoring information in real-time corresponds to determining at least one of:
one or more risks, wherein the one or more risks are associated with the modification of the business data corresponding to the risk assessment business data;
one or more compliance violations, wherein the one or more compliance violations are associated with the modification of the business data corresponding to the compliance regulation business data; and
one or more financial records violations, wherein the one or more financial record violations are associated with the modification of the business data corresponding the audit management business data.

12. The computer implemented method of claim 8, further comprising: determining one or more remedial solutions in response to the instantiation of the corresponding workflow.

13. The computer implemented method of claim 12, further comprising: displaying the one or more remedial solutions on a second user interface associated with the integrated application.

14. The computer implemented method of claim 8, further comprising: determining the framework based on the one or more identifiers, the framework selected from a group consisting of the compliance regulation framework, the risk assessment framework and the audit management framework.

15. A non-transitory computer readable storage medium storing instructions, which when executed by a computer, cause the computer to execute operations comprising:
establish a connection with a central monitoring framework and an in-memory data store by an integrated application, the in-memory data store storing business data associated with one or more key performance indicators,
wherein the integrated application includes a plurality of engines that operate in conjunction with each other, including an analytical engine and a user interface engine, and
wherein the central monitoring framework is configured to operate in conjunction with the integrated application to monitor activities in real-time, the activities including monitoring modifications in the business data and the associated key performance indicators stored in the in-memory data store;
detecting a modification in the one or more key performance indicators;
analyze, by the analytical engine, one or more values associated with the one or more key performance indicators to determine the modification;
generate, by a processor of a computer, one or more results corresponding to the modification, the one or more results including one or more modified key performance indicators and one or more identifiers based on the analysis;
map, via a mapping engine associated with the central monitoring framework, the one or more identifiers and the one or more modified key performance indicators with one or more control parameters in a corresponding framework to determine a deviation in the one or more values associated with the one or more key performance indicators;
based on the determination of the deviation of the one or more values, trigger and instantiate, via a workflow processing engine associated with the central monitoring framework, a corresponding workflow; and display on a user interface, via the user interface engine, monitoring information in real-time, the monitoring information including the one or more key performance indicators and the deviation in the one or more values associated with the key performance indicators.

16. The non-transitory computer readable storage medium of claim 15, wherein the modification includes: determining one or more values corresponding to the one or more key performance indicators, wherein the one or more key performance indicators correspond to the business data including financial information, compliance information, and confidential information.

17. The non-transitory computer readable storage medium of claim 15, wherein the workflow is associated with at least one of a compliance regulation framework, a risk assessment framework and an audit management framework.

18. The non-transitory computer readable storage medium of claim 15, wherein monitoring information in real-time corresponds to determining at least one of:

one or more risks, wherein the one or more risks are associated with the modification of the business data corresponding to the risk assessment business data;

one or more compliance violations, wherein the one or more compliance violations are associated with the modification of the business data corresponding to the compliance regulation business data; and one or more financial records violations, wherein the one or more financial record violations are associated with the modification of the business data corresponding the audit management business data.

19. The non-transitory computer readable storage medium of claim 15, further comprising instructions, which when executed by the computer, cause the computer to execute operations comprising: determine one or more remedial solutions in response to the instantiation of the workflow in the corresponding framework.

20. The non-transitory computer readable storage medium of claim 19, further comprising instructions, which when executed by the computer, cause the computer to execute operations comprising: display the one or more remedial solutions on a second user interface associated with the integrated application.

* * * * *